US008136026B2

(12) United States Patent
Commarford et al.

(10) Patent No.: US 8,136,026 B2
(45) Date of Patent: *Mar. 13, 2012

(54) HELP OPTION ENHANCEMENT FOR INTERACTIVE VOICE RESPONSE SYSTEMS (75) Inventors: Patrick M. Commarford, Delray Beach, FL (US); Cheryl A. Kotan, Omaha, NE (US); James R. Lewis, Delray Beach, FL (US); Wallace J. Sadowski, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 550 days.

This patent is subject to a terminal disclaimer.

(21) Appl. No.: 12/339,773

(22) Filed: Dec. 19, 2008

(65) Prior Publication Data
US 2009/0100337 A1    Apr. 16, 2009

Related U.S. Application Data (63) Continuation of application No. 10/670,632, filed on Sep. 25, 2003, now Pat. No. 7,490,286.

(51) Int. Cl.
G06N 3/00 (2006.01)
(52) U.S. Cl. ...................................... 715/200
(58) Field of Classification Search .................. 715/201, 715/202, 234, 243, 254, 255
See application file for complete search history.

(56) References Cited

U.S. PATENT DOCUMENTS

| 4,964,077 | A | 10/1990 | Eisen et al. |
|---|---|---|---|
| 5,124,942 | A | 6/1992 | Nielsen et al. |
| 5,287,448 | A | 2/1994 | Nicol et al. |
| 5,485,544 | A | 1/1996 | Nonaka et al. |
| 5,513,308 | A | 4/1996 | Mori |
| 5,737,726 | A | 4/1998 | Cameron et al. |
| 6,269,336 | B1 | 7/2001 | Ladd et al. |
| 6,314,449 | B1 | 11/2001 | Gallagher et al. |
| 6,725,378 | B1 | 4/2004 | Schuba et al. |
| 2002/0010715 | A1 | 1/2002 | Chinn et al. |
| 2004/0006478 | A1 | 1/2004 | Alpdemir et al. |
| 2004/0122674 | A1 | 6/2004 | Bangalore et al. |

Primary Examiner — Kyle Stork
(74) Attorney, Agent, or Firm — Novak Druce + Quigg LLP (57) ABSTRACT A method for providing help within an interactive voice response application can include the step of determining an interactive voice response event corresponding to a help menu request. The event can be classified as a default help request or a user initiated help request. If the event is classified as a default help request, a time for receiving user input can be set to a default value. If, however, the event is classified as a user initiated help request, the time for receiving user input can be set to a value less than the default value. The interactive voice response application can take programmatic action upon expiration of the time for receiving user input.

13 Claims, 4 Drawing Sheets

HELP OPTION ENHANCEMENT FOR INTERACTIVE VOICE RESPONSE SYSTEMS

CROSS REFERENCE TO RELATED APPLICATIONS

This application is a continuation of, and accordingly claims the benefit of, U.S. patent application Ser. No. 10/670,632, filed with the U.S. Patent and Trademark Office on Sep. 25, 2003, now U.S. Pat. No. 7,490,286.

BACKGROUND

1. Field of the Invention

The present invention relates to the field of computer software and, more particularly, to enhancing help options available for interactive voice response (IVR) systems.

2. Description of the Related Art

Interactive voice response (IVR) systems can provide human/computer interfaces included in a variety of applications, such as customer relation management systems, automated survey applications, telemarketing applications, customer service kiosks, and the like. IVR systems can audibly present a series of user selectable options and can responsively receive user input in the form of a speech input, a touch tone-keypad selection, and other such responses. Depending upon a user's selection, the IVR system can audibly present additional options, can audibly play an informational message, can initiate an automated action like a bill payment action, and/or can transfer a customer to a human agent. In an IVR system, a set of user-selectable options is typically referred to as a menu.

One common IVR menu is a help menu. The help menu can be initiated in any of a variety of ways including explicit selection, the occurrence of a time-out event where no input is received, and the occurrence of a no-match event where input is received which cannot be matched to a valid IVR option. Commonly, multiple help menus can be included within an IVR system, where the set of IVR help menus can be arranged in a variety of levels of increasing descriptive content and/or according to an established hierarchy of content. For example, a first-level help menu can include short phases providing context-sensitive help information. These short phrases can describe the available help options and corresponding keypad and/or voice commands necessary to select a desired option. A second-level help menu can present the same help options as the first-level, yet provide more comprehensive explanations for the menu options. Alternatively, a second-level help menu can be a further decomposition of one option presented within the first-level help menu. It should be noted that generally the greater number of menus provided within an IVR system, the more expensive it becomes to maintain and develop the IVR system. Accordingly, it can be preferable to implement as few help menu options as possible in order to achieve the desired functionality.

Conventional implementations of IVR help options generally present customers with the same help menus in the same fashion regardless of whether the help options were initialized by explicit selection, by a no-response event, or by a no-match event. In such systems, the default help menu presented to all users can be a default first-level help menu consisting of a concise listing of the most commonly utilized help options. This concise menu can be preferred by the majority of customers needing a small amount of help. A minority of IVR customers, however, can desire a detailed explanation of all available help options. Tailoring IVR help menus for the minority of customers can result in increased customer frustration in having to wade through rarely needed help options. The minority of users desiring enhanced IVR help, however, can be too significant to entirely ignore.

One conventional solution to this dilemma involves constructing a myriad of help menus that are differentially presented to customers depending on the method by which the help menus have been initiated. Utilizing situation dependant help menus, however, can increase IVR maintenance and development time and can be confusing to customers that are "mysteriously" presented with different help options from time to time. Consequently, it can be desirable to provide help for IVR systems in a manner in which the needs of both the majority and the minority of customers are satisfied without significantly increasing the number of different menus utilized by the IVR system.

SUMMARY OF THE INVENTION

The present invention provides a method, a system, and an apparatus for presenting help options within an interactive voice response (IVR) system. More specifically, a first-level help menu, which contains a concise presentation of the most commonly utilized help options, can be audibly presented. This first-level help menu can be initiated by explicit selection or by default based upon a monitored event, such as a no-response event and/or a no-match event. The no-response event can occur if no input is received by the IVR system for an established duration. A no-match event can occur if the IVR system receives input for which the IVR system cannot associate with a valid matching IVR option. If the first-level help menu IVR system has been explicitly selected, the time-out threshold against which the non-response timer is compared can be reduced. Consequently, an IVR system can automatically present a second-level help menu to users that explicitly requested help in a more expeditious fashion than would otherwise be the case. That is, users that were presented the first-level help menu by default will have to wait for a longer no-response period before the second-level help menu is automatically presented.

The benefits of the present invention can be understood by examining users that explicitly select IVR help verses those that receive help by default. The majority of both types of users can desire a concise presentation of help options. A minority of the users, however, can desire more comprehensive help. This minority can be proportionately greater for users that explicitly requested help than for users that received help by default.

Further, users that receive help by default generally require a delay period of between six and eight seconds to digest the audibly presented options and to input their selection. In contrast, users that have explicitly selected help, generally require a delay period of three seconds or less to input a desired help option. Additionally, users that have explicitly requested help are less confused when presented with additional help options after a pause than users that received the initial help options by default. For the above reasons, it can be beneficial to automatically present a comprehensive second-level menu of help after pausing for a relatively short time-out period whenever the first-level help menu has been explicitly selected.

One aspect of the present invention can include a method for providing help within an IVR application. The method can include the step of determining an IVR event corresponding to a help menu request. The event can be classified as a default help request or a user initiated help request. A default help request can include a help request resulting from a no-match event as well as a help request resulting from a no-response event. If the event is classified as the default help request, a time for receiving user input can be set to a default value. If, however, the event is classified as a user initiated help request, the time for receiving user input can be set to a value less than the default value. The IVR application can take programmatic action upon expiration of the time for receiving user input. In one embodiment, default value can be at least six seconds and the value less than the default value can be at most three seconds.

Another aspect of the present invention can include a method for providing help within an IVR application. The method can include the step of determining an event that initiates IVR help. A time-out threshold can be set to a default time. In one embodiment, the default time can be at least six seconds. The help-initializing event can include an explicit user selection for help, a no-response event, and/or a no-match event. If the action includes an explicit user selection for help, the time-out threshold can be decreased. In one embodiment, the time-out threshold can be at most three seconds. In a further embodiment, it can be preferable to set the time-out threshold between two seconds and three seconds. The first help menu can then be audibly presented. In another embodiment, after the presentation of the first help menu has begun, an explicit user selection for help can be received. In such an embodiment, if the time-out threshold equals the default time, the time-out threshold can be decreased.

Once the first help menu has been presented, a no-response timer can be started. If the no-response timer exceeds the time-out threshold, a second help menu can be audibly presented automatically. The second help menu can provide more comprehensive help than the first help menu. Once the second help menu has been presented, a no-response timer can be started for the second help menu. If the no response timer for the second help menu exceeds the time-out threshold, a previously established IVR operation can be preformed. The previously established IVR operation can include audibly presenting a help menu and/or establishing a connection with a human agent.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
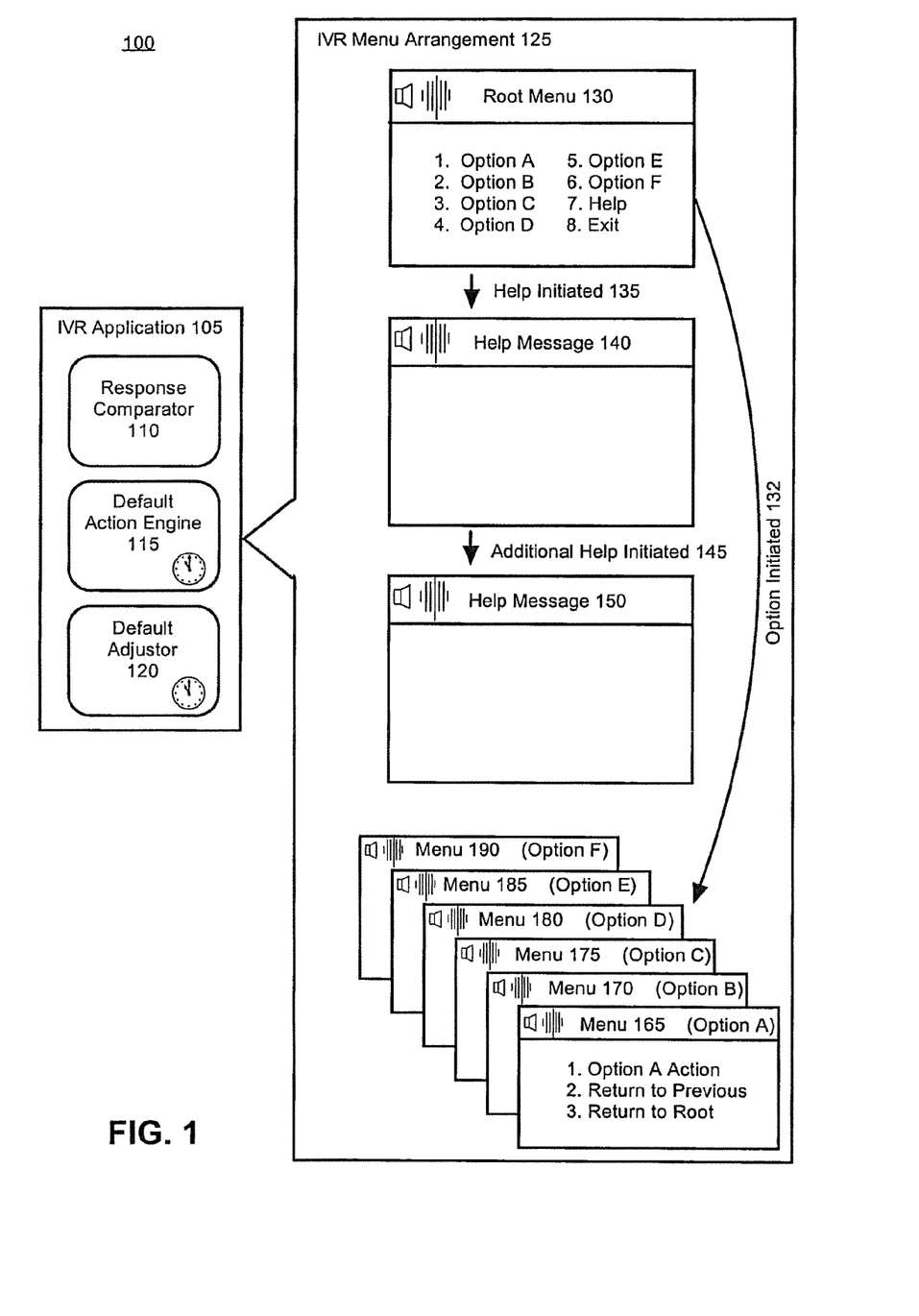
FIG. 1 is a schematic diagram illustrating a system showing one embodiment of an interactive voice response (IVR) application and related IVR menu arrangements according to the inventive arrangements disclosed herein.

FIG. 1 is a schematic diagram illustrating a system 100 showing one embodiment of an interactive voice response (IVR) application 105 and related IVR menu arrangements 125 according to the inventive arrangements disclosed herein. The IVR application 105 can be a software application configured to audibly present options in the form of speech segments and receive responses to presented options. The IVR application 105 can present a series of related options to a user in predefined groupings called IVR menus. The responses received by the IVR application 105 can be in the form of touchpad entries, voice responses, and the like. When the IVR application 105 receives one or more selections, an IVR response can be initiated. IVR responses can include presentation of further IVR menus, establishing a connection between the IVR user and a human agent, performing one or more automated software actions, such as a customer account query, and other similar IVR actions.

The IVR application 105 can include a multitude of components such as a response comparator 110, a default action engine 115, and a default adjustor 120. The response comparator 110 can receive user-responses, convert the responses to a format internally used by the IVR application 105 as necessary, and match the received responses against a set or collection of valid responses. For example, the response comparator 110 can receive a touchpad input and search for a corresponding option. In another example, the response comparator 110 can receive a voice input, speech-to-text convert the input, and search for a matching option. In particular embodiments, speech-to-text accuracy can be improved by limiting the conversion grammar used when performing the speech-to-text conversions to a limited grammar that includes all contextually valid responses. If the response comparator 110 determines that a received response matches an IVR option, then an action relating to the matching option can be automatically initiated. If, on the other hand, the response comparator 110 is unable to match a received input with an available IVR option, a no-match event can occur. A no-match event can signify that the user-provided input could not be matched with an available IVR option and/or that a user speech input is not contained within a grammar established by the IVR application 105 for performing text-to-speech conversions.

The default action engine 115 can be a component of the IVR application 105 that handles default IVR situations, such as situations relating to time-out events. For example, if a user fails to respond to the IVR application 105 after a designated time, a pre-selected action can be automatically taken. One such pre-selected action can be initializing a help menu, presupposing that the user has failed to respond because that user does not fully understand one or more options that have been presented. Another such pre-selected action can include disconnecting the user from the IVR Application 105. A disconnection default action generally requires a longer no-response or time-out period than the help presentation default action.

The default adjustor 120 can dynamically alter one or more of the conditions used by the default action engine 115, such as one or more time-out thresholds. Specifically, the default adjustor 120 can establish one time-out threshold for a help menu that was initiated by default and a shorter timer-out threshold for a help menu that was initiated through an explicit user selection. It should be noted, however, that the default adjustor 120 is not limited to manipulating time-out conditions, but can dynamically alter the behavior of the default action engine 115 in any fashion.

For example, the default adjustor 120 can cause a menu to be repeated the first time a time-out event occur subsequent to a no-match event. If a second time-out event occurs after the menu has been repeated once, the default adjustor 120 can establish settings resulting in the presentation of a designated help menu. If the time-out event occurs subsequent to a no-response event instead of a no-match event, then the default adjustor 120 can establish settings resulting in the presentation of the designated help menu. In the second scenario, the original menu would not be repeated to the IVR user.

The IVR application 105 can include many different menus and menu arrangements including, but not limited to, IVR menu arrangement 125. IVR menu arrangement 125 includes a root menu 130 that can be audibly presented to a user that has accessed the IVR application 105. The root menu 130 can include eight selectable options 1-8 including: (1) Option A, (2) Option B, (3) Option C, (4) Option D, (5) Option E, (6) Option F, (7) Help, and (8) Exit.

If any of the selections (1)-(6) are selected, a suitable option initiation 132 action can be performed resulting in an appropriate IVR action being initialized. For example, if selection (1) for Option A is received, IVR menu 165 corresponding to Option A can be initiated. In another example, if selection (2) for Option B is selected, corresponding menu 170 can be initiated. Similarly, menu 175 can be initialized responsive to selection (3), menu 180 can be initialized responsive to selection (4), menu 185 can be initialized responsive to selection (5), and menu 190 can be initialized responsive to selection (6).

If selection (8) or the "exit" option is selected, the IVR application 105 can disconnect the user from the IVR application 105. If, on the other hand, selection (7) or the "help" option is selected, a help initiated 135 procedure can be activated. The help initiated 135 procedure can also result from a no-match event, such as the user selecting option (9) that is not recognized by the response comparator 110. Additionally, the help initiated 135 procedure can result from a no-response event that occurs by default after a previously established response period has passed without input being received by the IVR application 105.

The help initiated 135 procedure can convey help menu 140 initialization information to the default adjustor 120, thereby allowing the default adjustor 120 to perform suitable operations. One such operation can establish a time-out threshold for help menu 140 of six to eight seconds if help menu 140 was initialized by a no-response event or a no-match event. Another such operation can establish a time-out threshold for help menu 140 of two to three seconds if help menu 140 was initialized by explicitly selecting help from the root menu 130. The help initiated 135 procedure can then initialize help menu 140.

Help menu 140 can provide a concise help message for commonly misunderstood and/or utilized IVR options. Specifically, help menu 140 can present (1) a help message for option A and allow Option A to be selected. Help menu 140 can also present (2) a help message/selection for Option B, (3) a help message/selection for Option C, (4) a return to root option, and (5) a repeat option. Selections (1)-(3) can result in option initiation action 155 causing menu 165, menu 170, or menu 175 to be initiated as appropriate. Selection (4) can result in the presentation of root menu 130. Selection (5) can result in menu 140 being repeated.

If a no-match event and/or a no-response event occurs after help menu 140 has been presented, an additional help initiated 145 procedure can be activated. The additional help initiated 134 procure can convey help menu 150 initialization information to the default adjustor 120, thereby allowing the default adjustor 120 to perform suitable operations. The additional help initiated 145 procedure can then initialize help menu 150.

Help menu 150 can provide a detailed message for one or more options of the IVR application 105 for which an explanation is rarely needed. Specifically, help menu 150 can present (1) a help message/selection for option D, (2) a help message/selection for Option E, (3) a help message/selection for Option F, (4) a return to root option, and (5) a repeat option. Selections (1)-(3) can result in option initiation action 160 causing menu 180, menu 185, or menu 190 to be initiated as appropriate. Selection (4) can result the presentation of root menu 130. Selection (5) can result in menu 150 being repeated.

The exact method for making a selection can depend upon the manner in which the IVR application 105 is implemented. In one example, a selection can be made by pressing the number one on a dial pad and/or by speaking the number one. In another example, the selection can be made by speaking "option one" and/or a natural language phrase translated by the IVR application 105 as referring to the first option. Appreciably, any of a variety of IVR selection methods can be utilized in conjunction with the present invention and the invention is not to be limited in this regard.

Additionally, if a default event for help menu 150 is determined by the default action engine 115, previously specified actions defined within the default action engine 115 can be performed. For example, a no-match event can result in the help menu 150 being repeated. In another example, a no-response event can result in menu 140 being repeated, a connection with a human agent being established, and/or the disconnection of the user from the IVR application 105. Different actions can be performed based upon the settings of the default action engine 115 at that time. For example, if settings of the default action engine 115 indicate that an explicit user help selection has been performed during this IVR session, a connection with a human agent can be established. If, however, settings of the default action engine 115 indicate that help menu 150 resulted from time-out actions, then the user can be disconnected from the IVR application 105.

It should be noted that in system 100, a second-level help menu, such as help menu 150, need not contain different options from a first-level help menu, such as help menu 140. Instead, help menu 150 can contain one or more of the same options presented in help menu 140. The difference between the common messages can relate to the level of description provided. That is, help menu 140 can present a concise help description and help menu 150 can present a more comprehensive help description.

Figure 2:
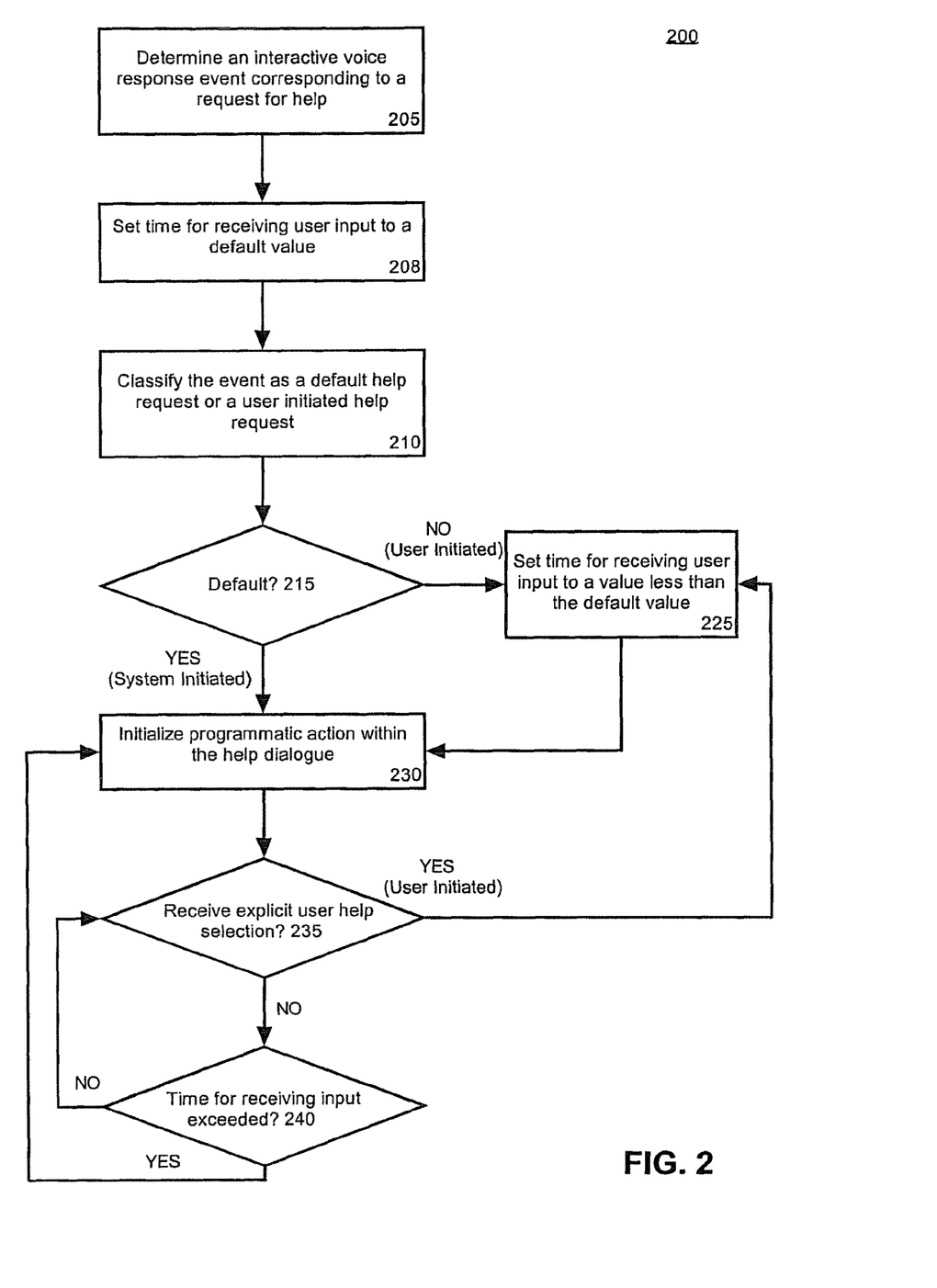
FIG. 2 is a flow chart illustrating a method for providing help within an IVR application according to the inventive arrangements disclosed herein.

FIG. 2 is a flow chart illustrating a method 200 for providing help within an IVR application according to the inventive arrangements disclosed herein. The method 200 can be performed using any IVR system that includes one or more help menus. The method 200 can begin in step 205 by determining an interactive voice response event corresponding to a help menu request. In step 210, the event can be classified as a default help request or a user initiated help request. Default help requests can include no-match events and no-response events. In step 215, if the event is a default event, the method can proceed to step 220 where a time for receiving user input can be set to a default value. Once the time has been set, the method can proceed to step 230, where the IVR can wait for user input until a time for receiving user input expires. When the time expires and no user input has been received, the IVR system can perform at least one programmatic action. For example, a programmatic action providing more comprehensive help can be activated. In another example, a programmatic action causing a user to be disconnected from the IVR system can be activated. Any action that the IVR is capable of performing can be the programmatic action initiated by step 230.

If, however, step 215 determines that the event is not a default event, but is instead a user initiated help request, then the method can proceed from step 215 to step 225. In step 225, a time for receiving user input can be set to a value less than the default value. For example, the default value can be changed from six seconds to three seconds. The method can proceed from 225 to step 230, where a programmatic action can be triggered upon the expiration of the time for receiving user input.

Figure 3A:
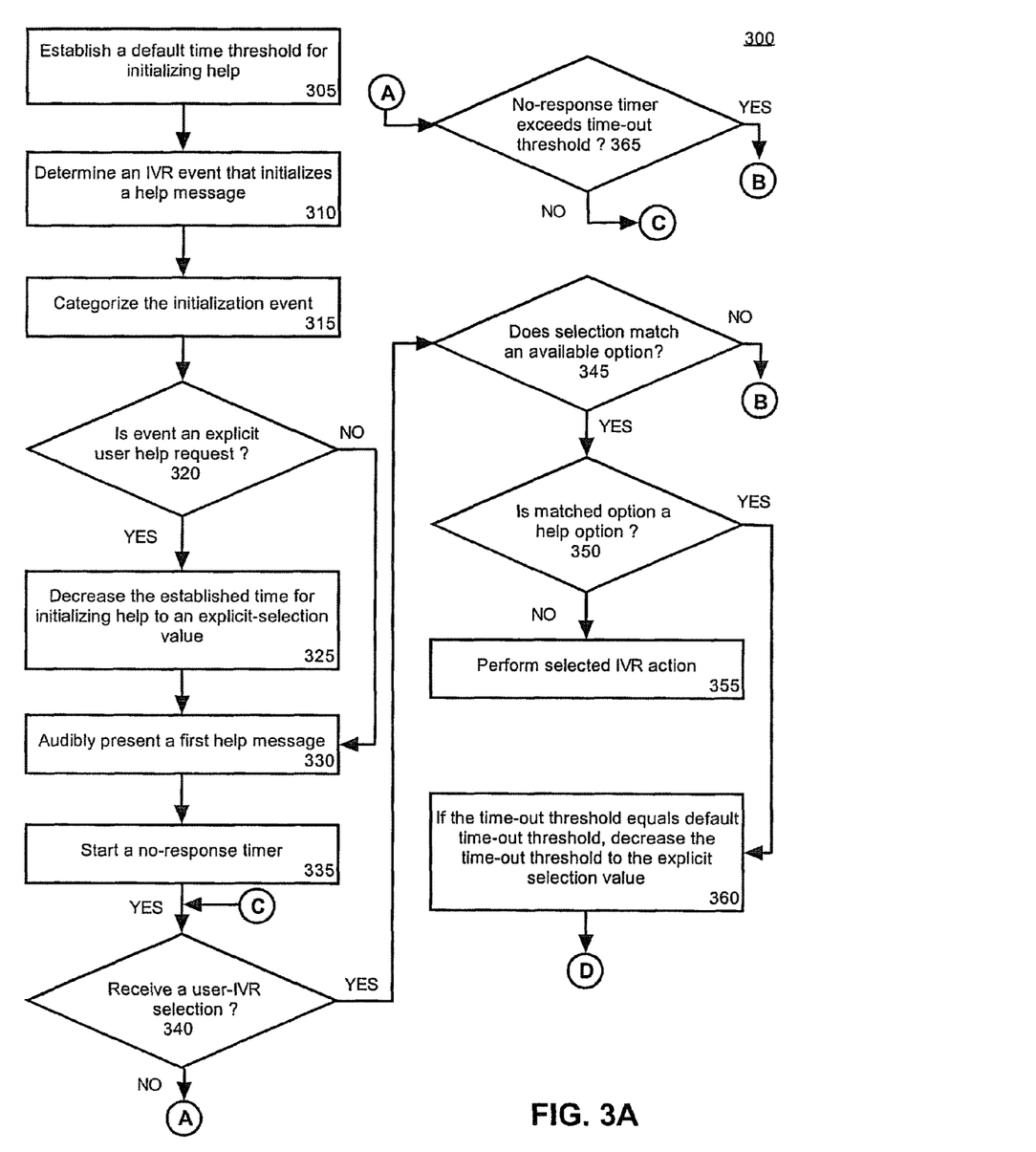
FIGS. 3A and 3B are flow charts illustrating another method for providing help within an IVR application according to the inventive arrangements disclosed herein.
Figure 3B:
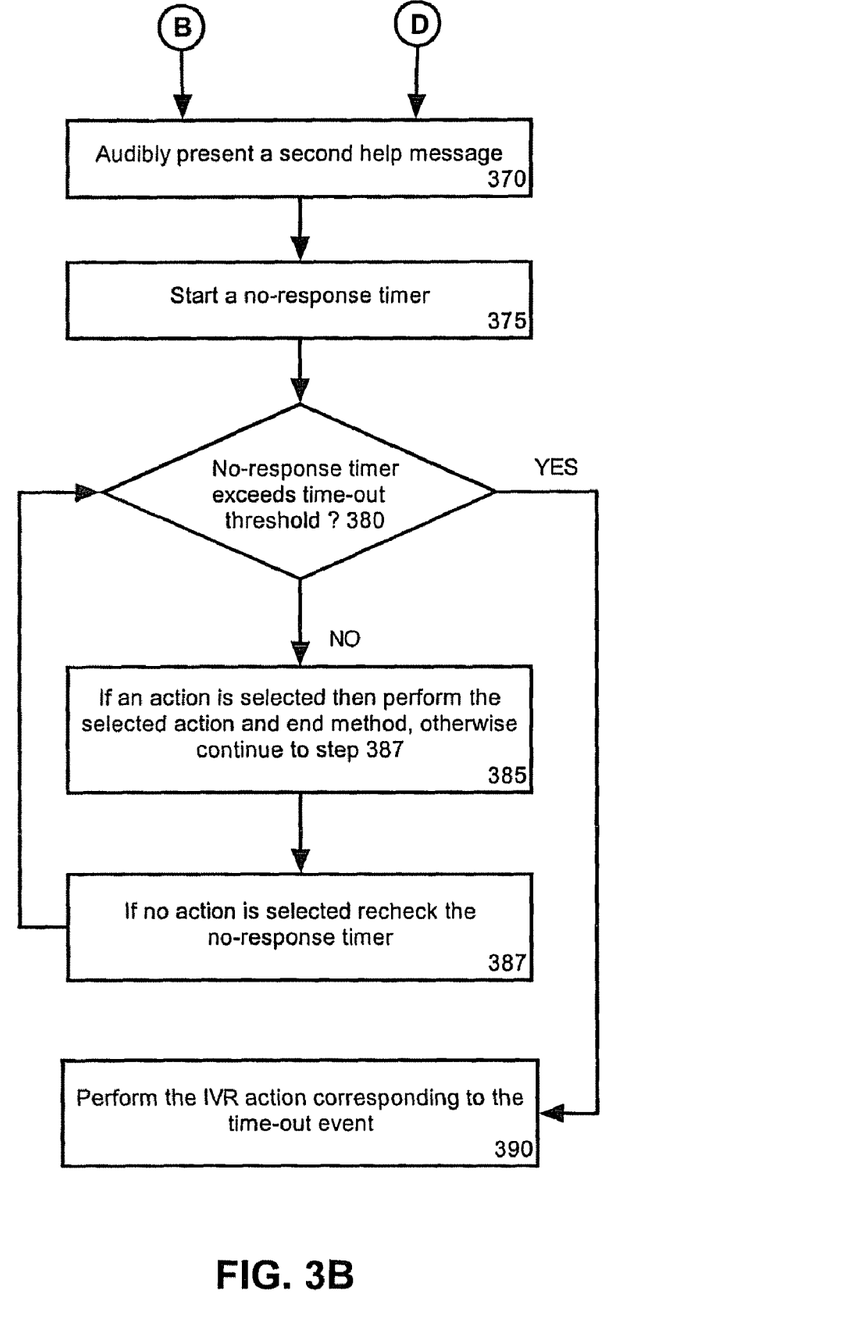

FIGS. 3A and 3B are flow charts illustrating a method 300 for providing help within an IVR application according to one embodiment of the inventive arrangements disclosed herein. Method 300 can begin in step 305 where a default time threshold for initializing help can be established. The default time threshold represents the time an IVR application will pause before a no-response event is triggered. A typical default value can be, but is not limited to, between approximately six and eight seconds. In step 310, an IVR event can be received that initializes a help menu. In step 315, the initializing action can be categorized as an explicit user selection request, a no-response event, and/or a no-match event. In step 320, if the event is an explicit user selection action, the method can proceed to step 325, otherwise the method can proceed to step 330.

In step 325, the established time threshold for initializing help can be decreased to an explicit-selection value, where the explicit-selection value can be a previously established time that is less than the default time. In one embodiment, the explicit-selection value can be, but is not limited to, between approximately two and three seconds. In step 330, a no-response timer can be started. In step 335, a first help menu can be audibly presented. In step 340, if a user IVR selection is not received the method can proceed to step 365. In step 365, the no-response timer can be compared against a time-out threshold. If the time-out threshold is not exceeded, the method can proceed to step 340, where a user-selection can be received. If the time threshold is exceeded in step 365, a time-out condition can result in the resetting of the timer and the presentation of a second help menu. Accordingly, the method can proceed from step 365 to step 370.

If in step 340, an IVR selection is received, the method can proceed to step 345, where the received selection can be compared with a set of recognized or available IVR options. If in step 345, the received option does not match an available option a no-match event can be initialized causing the method to proceed to step 370, where the no-response timer is reset and a second help menu can be presented. If in step 345, an available option is matched with the received selection, the method can proceed to step 350. If in step 350, the matched option is not a help option, the method can proceed to step 355 where the matched IVR action can be performed. The method can then end or repeat as necessary. If, however, the matched option is a help option, the method can proceed to step 360. In step 360, if the current time-out threshold equals the default time-out threshold as opposed to the explicit-selection value, then the time-out threshold can be decreased to the explicit-selection value. Then method can then proceed to step 370.

In step 370, a no-response timer can be started. In step 375, a second help menu can be audibly presented. In step 380, the no-response timer can be compared to the time-out threshold. If the time out threshold is not exceeded, the method can proceed to step 385. In step 385, if a user input is provided, then an IVR action associated with the input can be performed. The method can then end or repeat as necessary. If there is no input is provided, then the method can proceed to step 387 where the no-response timer can be rechecked by looping to step 380. If in step 380, the no-response timer exceeds the time-out threshold, the method can proceed to step 390, where the IVR action corresponding to the time-out event can be performed. Any previously designated IVR action can be associated with the time-out event and can be performed at this stage. For example, the time-out event of step 390 can result in the first help menu being repeated.

Similarly, the time-out event can cause the second help menu to be repeated and/or can cause a new, third help menu to be presented. In another example, the time-out event of step 390 can result in a connection being established between the IVR user and a human agent and/or can result in the IVR user being disconnected from the IVR application. It should be noted that the method can have more or levels than those described herein as required by particular IVR menu hierarchies.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system for providing help within an interactive voice response application comprising:
 a processor;
 a non-transitory computer readable storage having stored thereon instructions for controlling the processor for:
 determining an interactive voice response event;
 classifying said event as a default help request if said event is one of a no-match event and a time-out event, wherein the no-match event occurs when said event does not correspond to a user option provided by the application, and wherein the time-out event occurs if a user fails to respond to an application prompt within a predetermined duration of time;
 classifying said event as a user initiated help request if said event is a user request for help and not a non-help request;
 setting a time for receiving user input to a default value if said event is classified as said default help request;
 setting said time for receiving user input to a value less than said default value if said event is classified as said user initiated help request, wherein said interactive voice response application takes one of a plurality of different programmatic actions upon expiration of said time for receiving user input
 repeating a previous presentment of a menu or other prompt if a first time-out event occurs subsequent to a no-match event;

presenting a predetermined help message if a second time-out event occurs after repeating the previous presentment of the menu or other prompt;

presenting the predetermined help message such that the previous presentment of the menu or other prompt is not repeated if the first time-out event occurs subsequent to a no-response event;

determining whether the default help request is a no-match event or whether said default help request is a time-out event if said event is a default help request;

performing one of the plurality of programmatic actions if the default help request is a no-match event; and performing a different one of the plurality of programmatic actions if the default help request is a time-out event.

2. A system for providing help within an Interactive Voice Response application comprising the steps of:

a processor;

a non-transitory computer readable storage having stored thereon instructions for controlling the processor for:

determining an interactive voice response event corresponding to a request for help;

classifying said event as a default help request if said event is one of a no-match event and a time-out event, wherein the no-match event occurs when said event does not correspond to a user option provided by the application, and wherein the time-out event occurs if a user fails to respond to an application prompt within a predetermined duration of time, and classifying said event as a user initiated help request if said event includes a user request for help;

setting a time-out threshold to a default time;

decreasing said time-out threshold if and only if said event includes a user request for help;

audibly presenting a first help message;

starting a no-response timer once said first help message has been presented;

audibly presenting a second help message if said no-response timer exceeds said time-out threshold, wherein said second help message comprises one of a plurality of different help messages;

repeating a previous presentment of a menu or other prompt if a first time-out event occurs subsequent to a no-match event;

presenting a predetermined help message if a second time-out event occurs after repeating the previous presentment of the menu or other prompt;

presenting the predetermined help message such that the previous presentment of the menu or other prompt is not repeated if the first time-out event occurs subsequent to a no-response event;

determining whether the default help request is a no-match event or whether said default help request is a time-out event if said event is a default help request;

audibly presenting one of the plurality of help messages if the default help request is a no-match event; and audibly presenting a different one of the plurality of help messages if the default help request is a time-out event.

3. A non-transitory computer readable storage having stored thereon, a computer program having a plurality of code sections, said code sections executable by a computer system for causing the computer system to perform the steps of:

determining an interactive voice response event;

classifying said event as a default help request if said event is one of a no-match event and a time-out event, wherein the no-match event occurs when said event does not correspond to a user option provided by the application, and wherein the time-out event occurs if a user fails to respond to an application prompt within a predetermined duration of time;

classifying said event as a user initiated help request if said event is a user request for help and not a non-help request;

setting a time for receiving user input to a default value if said event is classified as said default help request;

setting said time for receiving user input to a value less than said default value if said event is classified as said user initiated help request, wherein said interactive voice response application takes one of a plurality of different programmatic actions upon expiration of said time for receiving user input;

repeating a previous presentment of a menu or other prompt if a first time-out event occurs subsequent to a no-match event;

if a second time-out event occurs after repeating the previous presentment of the menu or other prompt, presenting a predetermined help message;

if the first time-out event occurs subsequent to a no-response event, presenting the predetermined help message such that the previous presentment of the menu or other prompt is not repeated;

if said event is a default help request, determining whether the default help request is a no-match event or whether said default help request is a time-out event;

performing one of the plurality of programmatic actions if the default help request is a no-match event; and performing a different one of the plurality of programmatic actions if the default help request is a time-out event.

4. The non-transitory computer readable storage of claim 3, wherein said default value is at least six seconds and wherein said value less than said default value is at most three seconds.

5. A non-transitory computer readable storage having stored thereon, a computer program having a plurality of code sections, said code sections executable by a computer system for causing the computer system to perform the steps of:

determining an interactive voice response event corresponding to a help message request;

classifying said event as a default help request if said event is one of a no-match event and a time-out event, wherein the no-match event occurs when said event does not correspond to a user option provided by the application, and wherein the time-out event occurs if a user fails to respond to an application prompt within a predetermined duration of time;

classifying said event as a user initiated help request if said event includes a user request for help;

setting a time-out threshold to a default time;

if and only if said event includes a user request for help, decreasing said time-out threshold;

audibly presenting a first help message;

once said first help message has been presented, starting a no-response timer; and if said no-response timer exceeds said time-out threshold, audibly presenting a second help message, wherein said second help message comprises one of a plurality of different help messages;

repeating a previous presentment of a menu or other prompt if a first time-out event occurs subsequent to a no-match event;

if a second time-out event occurs after repeating the previous presentment of the menu or other prompt, presenting a predetermined help message;

if the first time-out event occurs subsequent to a no-response event, presenting the predetermined help message such that the previous presentment of the menu or other prompt is not repeated;

if said event is a default help request, determining whether the default help request is a no-match event or whether said default help request is a time-out event;

audibly presenting one of the plurality of help messages if the default help request is a no-match event; and audibly presenting a different one of the plurality of help messages if the default help request is a time-out event.

6. The non-transitory computer readable storage of claim 5, further comprising the steps of:

once said second help message has been presented, starting a no-response timer; and if said no-response timer for said second help message exceeds said time-out threshold, performing a previously established IVR operation.

7. The non-transitory computer readable storage of claim 6, wherein said previously established IVR operation includes resetting said time-out threshold to said default time.

8. The non-transitory computer readable storage of claim 6, wherein said previously established IVR operation includes audibly presenting a help message.

9. The non-transitory machine-readable storage of claim 6, wherein said previously established IVR operation includes at least one of cycling back to an initial help message, establishing a connection with a human agent, and establishing a connection with an automated system.

10. The non-transitory computer readable storage of claim 5, wherein said action which initialized said first help message includes at least one from the group consisting of said explicit user selection action, a no-response event, and a no-match event.

11. The non-transitory computer readable storage of claim 5, further comprising the steps of:

after said presentation of said first help message has begun, receiving an explicit user request for help; and if said non-response threshold equals said default time, decreasing said time-out threshold.

12. The non-transitory computer readable storage of claim 5, wherein said decreased time-out threshold is at most three seconds.

13. The non-transitory computer readable storage of claim 5, wherein said default time is at least six seconds.

* * * * *